3,450,238
ADJUSTABLE-TORQUE ELECTROMAGNETIC CLUTCH
John S. Adkins, Santa Monica, Calif., assignor to Force Limited, Santa Monica, Calif., a corporation of California
Filed Sept. 26, 1966, Ser. No. 581,782
Int. Cl. F16d *37/02*
U.S. Cl. 192—21.5                                            9 Claims

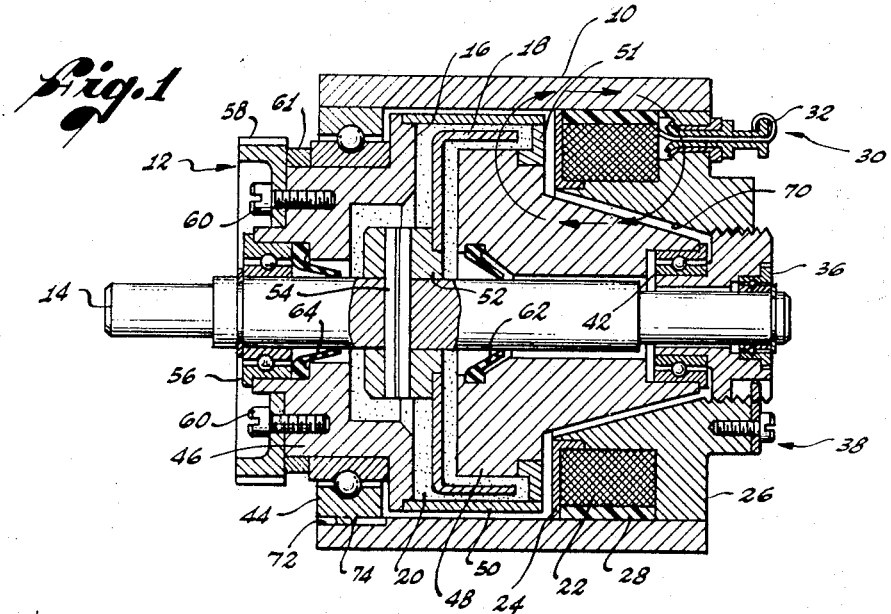
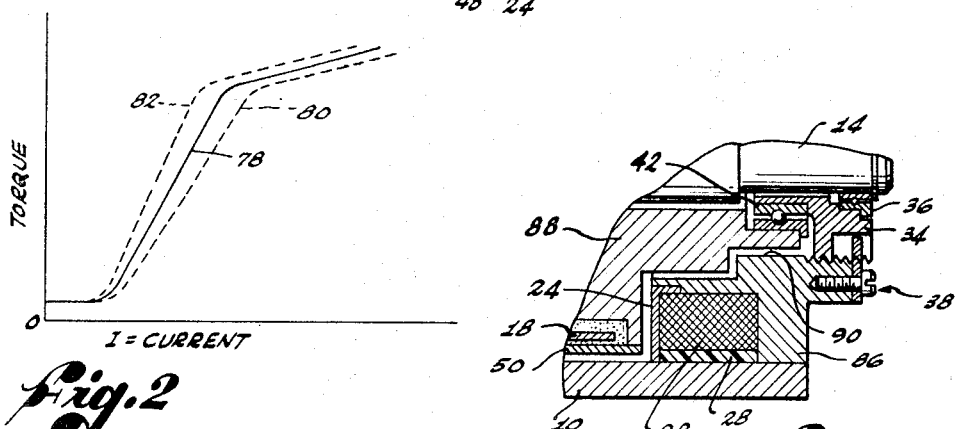
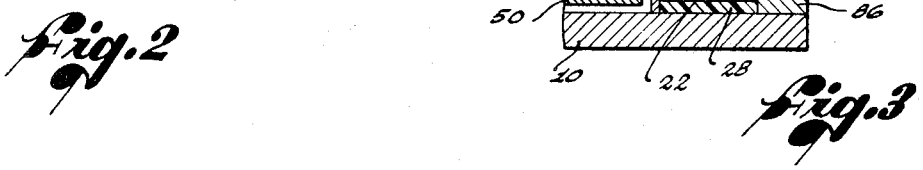
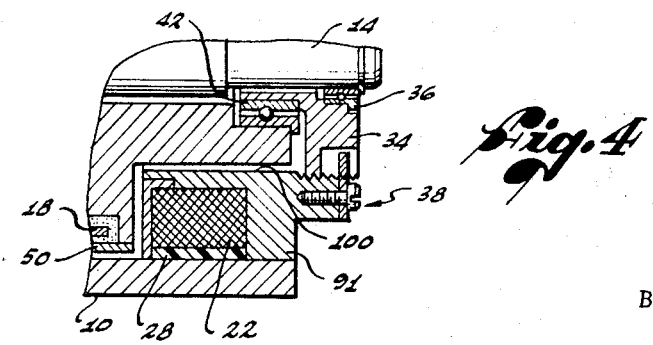
INVENTOR.
JOHN S. ADKINS
BY Fulwider, Patton, Rieber
Lee, and Utecht
ATTORNEYS United States Patent Office 3,450,238
Patented June 17, 1969

ABSTRACT OF THE DISCLOSURE

An electromagnetic clutch having a stationary energizing coil, a rotatable driving member containing magnetic powder and a rotatable driven member carrying a drag cup located in the magnetic powder and adapted to be coupled to the driving member therethrough. A flux transfer ring is mounted on the driving member to define and surround the space occupied by the magnetic powder and the drag cup on the driven member, substantially all of the rotating parts being enclosed within a stationary housing. One form of the invention provides for variation of the torque current characteristics of the clutch by varying the air gap between the stationary and driving magnetic surfaces but without changing the characteristics of the magnetic circuit adjacent the magnetic powder gap, thereby directly changing the flux in the magnetic circuit.

---

Typically, electromagnetic clutches are designed and engineered to known specifications which state the torque requirements at specified currents applied to the clutch coil. Parts are made and assembled in accordance with the finalized design, and the end products are tested to determine whether they meet the torque/current requirements.

It is often found in a given production run that a number of clutches do not meet the requirements of the specifications. In this connection, while the parts are made with dimensions which fall within specified tolerance limits, the combination of parts used frequently results in end products which have torque/current characteristics that fall outside the specified requirements. When this occurs, the clutch is either rejected, or, by trial and error, substitutions are made for various parts until a clutch is obtained which does have the required operating characteristics. As is apparent, the cost of making such clutches is undesirably high, and results in objectionably high sales prices to buyers.

Another disadvantage of previously known electromagnetic clutches resides in the fact that it is not practical to change the operating characteristics of a clutch after it is assembled. Either the clutch cannot be changed at all, or if it can, it must be dismantled and parts thereof re-shaped—a process which is unduly time consuming and expensive.

In addition, prior art clutches are characterized by the use of stationary and rotatable parts which define a chamber for a drag cup and magnetic powder, and a shaft to which the drag cup is fixed. Typically, a coil is carried on the rotating part, and slip rings are used for coupling a current source to the coil. The rotatable part is the driving member to which the drag cup and shaft are magnetically coupled via the powder when the coil is energized.

It is an object of my invention to provide an electromagnetic clutch which overcomes the above and other disadvantages of the prior art.

Another object of my invention is to provide an improved electromagnetic clutch in which its operating characteristics can be easily adjusted after assembly.

It is also an object of my invention to provide an electromagnetic clutch structure having a minimum number of component parts of simple design and rugged construction.

It is yet another object of my invention to provide a stationary coil clutch construction without slip rings, wherein a chamber for a drag cup and magnetic powder is entirely within the driving member, such driving member being housed in a stationary shell, and such driving member having a magnetically isolated flux transfer ring adjacent the shell for coupling the drag cup to the shell, such shell functioning as part of the magnetic circuit and as a heat sink.

The above and other objects and advantages of my invention will become apparent from the following description taken in conjunction with illustrative embodiment thereof, in which:

FIGURE 1 is a longitudinal sectional view of a clutch of my invention, showing confronting portions of stationary and rotatable parts defining a tapered annular air gap, and means for selectively adjusting the parts and such air gap so as to obtain desired torque/current characteristics;

FIGURE 2 is a graph of torque versus current for the clutch of FIGURE 1, to aid in explaining how adjustments of the parts after assembly result in desired torque/current characteristics;

FIGURE 3 is a fragmentary sectional view of a portion of a clutch of my invention wherein a stepped air gap is defined by concentric portions of stationary and rotatable parts of different diameters wherein torque is not adjustable; and FIGURE 4 is a fragmentary sectional view of a portion of a clutch of my invention, wherein the confronting portions of relatively adjustable parts define a straight cylindrical air gap and wherein torque is not adjustable.

Referring to FIGURE 1, a clutch of my invention is shown which comprises a stationary housing or shell 10 of magnetic material, in which a driving member 12 is rotatably mounted, and wherein a shaft 14 to be driven is rotatably mounted within the driving member 12. Within the driving member 12 is an annular space 16 in which is located a drag cup 18 carried on the shaft 14, and which is filled with magnetic powder.

Torque applied to the shaft 14 by the driving member 12 is effected by selectively magnetically coupling the drag cup 18 to the driving member 12. For this purpose, a clutch coil 22 is supported within the stationary housing 10 and adapted when energized to create a magnetic field of desired strength and thereby effect the desired degree of magnetic coupling, and corresponding operation of a mechanism (not shown) to be operated by the shaft 14. While this broad purpose is conventional for magnetic powder type clutches, it will become apparent that the arrangement and functioning of the parts of the clutch of FIGURE 1 provide novel advantages which are not apparent from the prior art.

Referring now in more detail to the clutch of FIGURE 1, the coil 22 is shown mounted on a non-magnetic coil form 24, and carried on a reduced diameter portion of a magnetic core member 26 that is secured in one end of the housing 10, as by brazing. The periphery of the wound coil 22 is bonded to the inner surface of the housing 10, as by a non-magnetic plastic bonding material 28. Suitable openings are provided in the core member 26 for feed-through terminals 30 through which the ends 32 of the coil 22 extend. It will be obvious that such a feed-through terminal is provided for each end of the coil.

The core member 26 has a central opening which is tapped, and in which is threaded a screw member 34 through which one end of the shaft 14 extends. The shaft 14 is rotatable within the screw member 34, as by a ball bearing 36 having its inner and outer races, respectively, secured to the shaft 14 and to the screw member 34. The screw member 34 is adapted to be locked to the core member 26, as by lock screw means indicated at 38.

Inwardly of the threaded portion thereof, the screw member 34 rotatably supports one end of the driving member 12, as on a ball bearing 42 having its races secured to the confronting parts. At the opposite end of the housing 10, the driving member 12 is supported for rotation, as by a bearing 44 having its outer race slidably mounted in the housing 10, and its inner race secured to the driving member 12.

The driving member 12 is shown composed of an end plate 46 on which the inner race of the bearing 44 is mounted, an inner magnetic core member 48 which at one end is supported by the bearing 42, a flux transfer ring 50 secured at one end to the inner end of the end plate 46, and a non-magnetic isolator ring 51 between the other end of the flux transfer ring 50 and the core member 48. The flux transfer ring 50 is located immediately adjacent the inner surface of the housing 10, and the confronting surface portions of the rings 50, 51 and the core member 48 define an annular space for the skirt of the drag cup 18.

The body of the cup 18 is disposed in the space between the confronting ends of the end plate 46 and the core member 48. The drag cup 18 is secured to the shaft in any suitable manner, e.g., as on a hub 52 that is secured to the shaft 14 by a hollow roll pin 54, and in such case the inner end of the end plate 46 has an enlarged opening to receive the hub 52.

As shown at the left end of FIGURE 1, the shaft 14 is rotatably supported in the end plate 46, as by a ball bearing 56 that has its races secured to the shaft and to the end plate 46. Also, a gear element 58 is secured to the end plate 46, as by set screws 60, and is the means by which the driving member 12 is rotated from a driving source (not shown). A shim 61 is located between the gear 58 and the inner race of the bearing 44.

Suitable seals are provided to prevent the magnetic powder from escaping along the shaft 14. In the example shown, frustoconical rubber seal members 62, 64 are employed which are anchored at their large ends to the core member 48 and the end plate 46, and which sealingly engage the shaft 14 at their smaller ends.

In the clutch of FIGURE 1, the rotating core member 48 extends into the stationary core member 26, whereby the coil 22 surrounds both stationary and rotatable parts. With this arrangement, a flux field established by the coil 22 when energized passes through the adjacent portion of the core member 26 surrounded by the coil, the air gap 70 between the core members 26, 48, the core member 48, the skirt of the drag cup 18, the flux transfer ring 50, and the housing 10, all as indicated by the curved arrows in the upper portion of FIGURE 1. Thus, the magnetic powder in the flux field is magnetized, thereby magnetically coupling the drag cup 18 to the driving member 12, and hence establishing rotation of the shaft 14.

The above-described arrangement of parts has the advantage that substantially all of the rotating parts are enclosed within a stationary housing. This is made possible by virtue of the use of the flux transfer ring 50. In this connection, it will be apparent that in the absence of the flux transfer ring, the shell itself would have to be made a part of the driving member, which is the conventional approach employed in prior art magnetic powder type clutches.

Furthermore, my invention has the distinct advantage that the torque/current characteristic can readily be adjusted after assembly of the parts. In this connection, it will be noted that axial adjustment of the screw member 34 determines the axial position of the driving member 12, together with the shaft 14 and the drag cup 18. To facilitate such axial movement of the driving member 12, the outer race of the bearing 44 is not secured to the surrounding portion of the housing 10, but is slidable therein. To prevent rotation of the outer race of the bearing 44, the housing 10 may be provided with a longitudinal groove 72 in its inner wall, within which there is located a tongue projection 74 on the outer race.

Let it be assumued that when the parts are initially assembled, the gap 70 between the core members 26, 48 is such that the torque/current characteristic of the clutch is that indicated by the solid curve 78 in FIGURE 2. Also, let it be assumed that such torque/current characteristic 78 provides greater torque at specified current values, and that the dotted characteristic 80 (on the right of the curve 78 in FIGURE 2) represents the desired characteristic. In such case, the screw member 34 is turned inwardly, thereby moving the driving member 12, shaft 14 and drag cup 18 to the left and increasing the size of the gap 70 between the core members 26, 48, until the torque/current characteristic 80 is obtained.

By the same token, the torque/current characteristic 78 of the assembled clutch may be one which is revealed to give less torque for specified current values than is desired, the desired characteristic being illustrated by the dotted characteristic 82 to the left of the curve 78 in FIGURE 2. In such case, threading the screw member 34 outwardly moves the driving member 12, shaft 14 and drag cup 18 to the right, thereby decreasing the gap 70, until the desired characteristic 82 is obtained.

It will be noted that the core members 26, 48 in FIGURE 1 are tapered so as to be frustoconical, whereby a considerable portion of the gap 70 is similarly frustoconical. However, it will be apparent that my invention embraces a variety of shapes for the core members, and correspondingly a variety of gap configurations. For example, FIGURE 3 illustrates a modified structure in which core members 86, 88 corresponding to the core members 26, 48 of FIGURE 1, are shaped with concentric cylindrical portions of different diameters, thereby to form a stepped air gap 90. FIGURE 4 illustrates a further modified structure in which core member 91, corresponding to the member 26 of FIGURE 1, has confronting cylindrical surfaces forming a straight cylindrical air gap 100.

In the arrangement of FIGURE 3, as in the arrangement of FIGURE 1, the core member 88 is rotatably supported by the screw member 34, via the bearing 42. Also, the driving member in both the structures shown in FIGURES 3 and 4 are selectively axially positioned by appropriate adjustments of the screw member 34. However such selective axial positioning does not vary the air gap and the magnetic flux and does not adjust the torque/current characteristics.

I claim:
1. A clutch comprising:
  a rotatable magnetic member having an internal cavity containing magnetic powder;
  a clutch element in said cavity;
  a shaft, said clutch element being secured to the shaft, said magnetic member being rotatable about said shaft;
  a stationary magnetic member, said stationary and rotatable magnetic members having confronting portions separated by an air gap and being interconnected by bearings into a unitary, self-sustaining clutch structure;
  and a coil supported on said stationary member and operable during flow of energizing current therethrough to establish a magnetic field through said magnetic members which crosses the air gap and passes through the cavity to magnetize the powder and cause the clutch element and shaft to rotate with said rotatable member, said stationary member including a magnetic shell surrounding said rotatable member, said rotatable member including a flux transfer ring forming the outer peripheral portion of the cavity, said flux transfer ring at the end thereof nearest said coil being magnetically isolated from the adjacent portion of said rotatable member, whereby magnetic flux passing through said cavity and clutch element is caused to pass through said flux transfer ring and said shell.

2. The clutch of claim 1, wherein the shaft torque for a predetermined energizing current is related to the size of the air gap; and means for selectively axially positioning said rotatable member after assembly to make the air gap remote from the magnetic powder of such size as to establish a predetermined shaft torque for a predetermined energizing current.

3. The clutch of claim 2, wherein said positioning means includes a positioning element supported in said stationary member for movement along the axis of said shaft, said positioning element engaging said rotatable member, said positioning element being operable from the exterior of said stationary member to effect axial adjustment of said rotatable member and said shaft on said axis.

4. The clutch of claim 1, wherein said magnetic shell is a cylindrical housing surrounding said rotatable member, said rotatable member including an end plate and a magnetic core spaced apart, said core and said stationary member being separated by the air gap;
   a non-magnetic ring secured to said core;
   and wherein said flux transfer ring is a cylindrical element fixed at its ends to said end plate and said non-magnetic ring, said flux transfer element being concentric with and in close proximity to the inner wall of said housing, said cavity being defined by the end plate, flux transfer element and core.

5. The clutch of claim 4, wherein said stationary member is a magnetic core extending into and secured to said housing, said coil surrounding and being supported on the portion of the stationary core within said housing;
   an adjustment screw for axially positioning said rotatable member, said screw extending from the exterior of the stationary core to engage the rotatable core.

6. The clutch of claim 5, wherein the shaft extends through said adjustment screw and is rotatably supported therein.

7. The clutch of claim 6, wherein the rotatable core is rotatably mounted on the inner end of said screw, and said end plate is rotatably supported in said housing.

8. A clutch comprising:

a rotatable magnetic member having an internal cavity containing magnetic powder;
a clutch element in said cavity;
a shaft, said clutch element being secured to the shaft, said magnetic member being rotatable about said shaft;
a stationary magnetic member, said magnetic members having confronting portions separated by an air gap;
a coil supported on said stationary member and operable during flow of energizing current therethrough to establish a magnetic field through said magnetic members which crosses the air gap and passes through the cavity to magnetize the powder and cause the clutch element and shaft to rotate with said rotatable member, the shaft torque for a predetermined energizing current varying with the size of the air gap in the magnetic circuit which varies the magnetic flux therein;
and means for selectively axially positioning said rotatable member after assembly to change the air gap between the stationary and rotatable magnetic members remote from the magnetic powder to establish a desired shaft torque for a predetermined energizing current.

9. The clutch of claim 8 wherein said positioning means includes a positioning element supported in said stationary member for movement along the axis of said shaft, said positioning element engaging said rotatable member, said positioning element being operable from the exterior of said stationary member to effect axial adjustment of said rotatable member and said shaft on said axis.

References Cited
UNITED STATES PATENTS

| | | | |
|---|---|---|---|
| 2,709,507 | 5/1955 | Trickey | 192—21.5 |
| 2,752,800 | 7/1956 | Raymond et al. | 192—21.5 |
| 2,872,001 | 2/1959 | Feiertag et al. | 192—21.5 |
| 2,903,110 | 9/1959 | Moody | 192—21.5 |
| 3,001,619 | 9/1961 | Imperi | 129—21.5 |

BENJAMIN W. WYCHE III, *Primary Examiner.*

L. J. PAYNE, *Assistant Examiner.*

U.S. Cl. X.R.

188—164